(12) United States Patent
Griffin (10) Patent No.: US 11,907,899 B2
(45) Date of Patent: Feb. 20, 2024

(54) COUNTING A NUMBER OF OBJECTS IN AN IMAGE

(71) Applicant: Insight Direct USA, Inc., Tempe, AZ (US)

(72) Inventor: Michael Griffin, Wayland, MA (US)

(73) Assignee: Insight Direct USA, Inc., Chandler, AZ (US)

( * ) Notice: Subject to any disclaimer, the term of this patent is extended or adjusted under 35 U.S.C. 154(b) by 349 days.

(21) Appl. No.: 17/410,849

(22) Filed: Aug. 24, 2021

(65) Prior Publication Data
US 2022/0114537 A1    Apr. 14, 2022

Related U.S. Application Data

(60) Provisional application No. 63/090,604, filed on Oct. 12, 2020, provisional application No. 63/155,090, filed on Mar. 1, 2021.

(51) Int. Cl.
*G06Q 10/087* (2023.01)
*G06T 11/20* (2006.01)
*G06V 20/20* (2022.01)

(52) U.S. Cl.
CPC ............ *G06Q 10/087* (2013.01); *G06T 11/20* (2013.01); *G06V 20/20* (2022.01); *G06T 2210/12* (2013.01)

(58) Field of Classification Search
CPC ... G06Q 10/087; G06T 11/20; G06T 2210/12; G06V 20/20; G06V 10/457; G06V 20/64; G06V 20/647
See application file for complete search history.

(56) References Cited

U.S. PATENT DOCUMENTS

| | | | |
|---|---|---|---|
| 9,047,509 B2 * | 6/2015 | Wolk | G06V 30/413 |
| 9,996,818 B1 * | 6/2018 | Ren | G06F 16/5866 |
| 10,157,452 B1 * | 12/2018 | Tighe | G06T 5/006 |
| 10,336,150 B1 * | 7/2019 | Hebert | G05B 19/0426 |
| 10,671,856 B1 * | 6/2020 | Ren | G06Q 10/087 |
| 11,030,763 B1 * | 6/2021 | Srivastava | G06T 7/557 |
| 11,176,692 B2 * | 11/2021 | Ghadyali | G06V 20/52 |
| 2008/0120200 A1 * | 5/2008 | Hurtis | G06Q 10/087 |
| | | | 705/28 |
| 2010/0017407 A1 * | 1/2010 | Beniyama | G06F 16/5854 |
| | | | 707/E17.016 |
| 2012/0120196 A1 * | 5/2012 | Tsai | G06T 7/194 |
| | | | 348/46 |
| 2017/0177969 A1 * | 6/2017 | Zaremski | G06V 20/52 |
| 2017/0178061 A1 * | 6/2017 | Griffin | G06Q 10/087 |

(Continued)

*Primary Examiner* — Xuemei G Chen
(74) *Attorney, Agent, or Firm* — Kinney & Lange, P.A.

(57) ABSTRACT

A product count of a number of physical products within a physical grouping of a plurality of the physical products is determined based on an image of the physical grouping. A cycle counter generates image coordinates for visible product surfaces within the image. The cycle counter generates three-dimensional virtual base coordinates for the expected locations of the plurality of the physical products within the physical grouping. The cycle counter determines the actual locations of the visible product surfaces within three-dimensional space based on a comparison of the image coordinates and the virtual base coordinates. The cycle counter determines the product count of the number of physical products within the physical grouping based on the actual locations.

20 Claims, 6 Drawing Sheets

(56) References Cited

U.S. PATENT DOCUMENTS

2017/0178227 A1\* 6/2017 Graham ............. G06Q 30/0643
2019/0303699 A1\* 10/2019 Dwivedi ................... G06T 7/50
2020/0051272 A1\* 2/2020 Mukherjee .............. G06M 1/00

\* cited by examiner

COUNTING A NUMBER OF OBJECTS IN AN IMAGE

CROSS-REFERENCE TO RELATED APPLICATION(S)

This application claims priority to U.S. Provisional Application No. 63/090,604 filed Oct. 12, 2020, and entitled "COUNTING A NUMBER OF OBJECTS IN AN IMAGE," and claims priority to U.S. Provisional Application No. 63/155,090 filed Mar. 1, 2021, and entitled "COUNTING A NUMBER OF OBJECTS IN AN IMAGE," the disclosures of which are hereby incorporated by reference in their entireties.

BACKGROUND

This disclosure relates generally to object counts. More particularly, this disclosure relates to autonomously generating object counts based on single images.

Cycle counting is the practice of counting products for the purposes of creating accurate inventories. Accurate inventories are essential for order fulfillment and for auditing purposes. Both manufacturers and distributors conduct cycle counting. Most do so by sending dedicated personnel around their warehouses to count and record the number of products. Many companies have thousands of products, which can make cycle counting time consuming and costly, and despite the simplicity of the task, the counts are often inaccurate leading to indirect costs such as failure to fill orders or carrying too much inventory. In some cases, computer vision techniques are utilized to automate the cycle counting process and to help decrease human-related errors in counting. For example, individual products can be identified from an image, the product count being the number of individual products visible within the image.

Standard computer vision techniques for cycle counting are often limited by the field of vision of the image capturing device (e.g., camera). That is, product counts based on the image of the products does not typically account for those products that may be outside the field of view of the image capturing device (e.g., to the side, covered by other product, etc.). In such cases when the field of view of the image does not include all of the products, human-based counting is often utilized to supplement the computer-based count. Such human interaction can decrease efficiency of the cycle counting operations and can introduce human-related errors into the final product count.

SUMMARY

According to an aspect of the disclosure, a method of cycle counting includes receiving, by a computing device, captured image data of a plurality of physical products forming a physical grouping; identifying, by the computing device, visible surfaces of the plurality of physical products based on the captured image data and by a recognition computer vision model trained on baseline image data corresponding to physical parameters of the plurality of physical products, to generate identified visible surfaces; generating, by the computing device, image coordinates for the identified visible surfaces, wherein each image coordinate is a two-dimensional coordinate associated with one of the identified visible surfaces; generating, by the computing device, a virtual product grouping and base coordinates corresponding to a plurality of virtual products forming the virtual product grouping, wherein each base coordinate is a three-dimensional coordinate associated with a virtual product of the plurality of virtual products; associating, by the computing device, each identified visible surface with a virtual surface of the plurality of virtual products based on a comparison of the image coordinates and the base coordinates; classifying, by the computing device, each identified visible surface as horizontal or vertical, thereby generating classified visible surfaces; determining, by the computing device, a product count of the plurality of physical products in the physical grouping based on an order of the classified visible surfaces; and outputting, by the computing device, the product count.

According to an additional or alternative aspect of the disclosure, a cycle counter configured to generate product counts for a physical grouping formed by a plurality of physical product includes control circuitry; and memory encoded with instructions that, when executed by the control circuitry, cause the control circuitry to identify visible surfaces of the plurality of physical products based on captured image data received by an image-captured device and by a recognition computer vision model trained on baseline image data corresponding to physical parameters of the plurality of physical products, to generate identified visible surfaces; generate image coordinates for the identified visible surfaces, wherein each image coordinate is a two-dimensional coordinate associated with one of the identified visible surfaces; generate a virtual product grouping and base coordinates corresponding to a plurality of virtual products forming the virtual product grouping, wherein each base coordinate is a three-dimensional coordinate associated with a virtual product of the plurality of virtual products; associate each identified visible surface with a virtual surface of the plurality of virtual products based on a comparison of the image coordinates and the base coordinates; classify each identified visible surface as horizontal or vertical, thereby generating classified visible surfaces; determine a product count of the plurality of physical products in the physical grouping based on an order of the classified visible surfaces; and output the product count.

DETAILED DESCRIPTION

According to techniques of this disclosure, a number of physical products within an aggregation or other grouping of the physical products can be determined based on a single image of the aggregation and, in some examples, information associated with the physical product, such as physical dimension information of the physical product. The number of physical products within the aggregation can be determined from captured image data generated in the form of a single image, without requiring that each of the physical products within the aggregation be visible in the image data. Techniques of this disclosure can be utilized for cycle counting operations in the context of, for example, inventory tracking, using a single image of, for example, a full or partially full aggregation of the physical product, such as product on a pallet, even when one or more of the individual physical products is not visible within the image of the aggregation. For example, some of the physical products in the aggregation may be behind visible products or otherwise not visible within the image.

The techniques described herein combine commonly available product information with the output of customized computer vision applications to accurately generate product counts. The techniques described herein can generate accurate product counts that include counts of physical products that are visible in the image data and physical products that are hidden behind other physical products in the image data or that are otherwise obscured. The techniques use customized computer vision applications to identify key characteristics of the physical products that allow for counting of physical products that are both visible and not visible within the image. As such, the techniques of this disclosure increase the efficiency of cycle counting operations within the field of, e.g., inventory tracking, while decreasing the number of human-related errors that may arise with manual (e.g., human) counting of the products. The techniques of this disclosure provide accurate, quick counts across multiple product types and groupings based on a determined three-dimensional position of each physical product, providing accurate counting of both visible and obscured physical product forming the grouping.

Figure 1A:
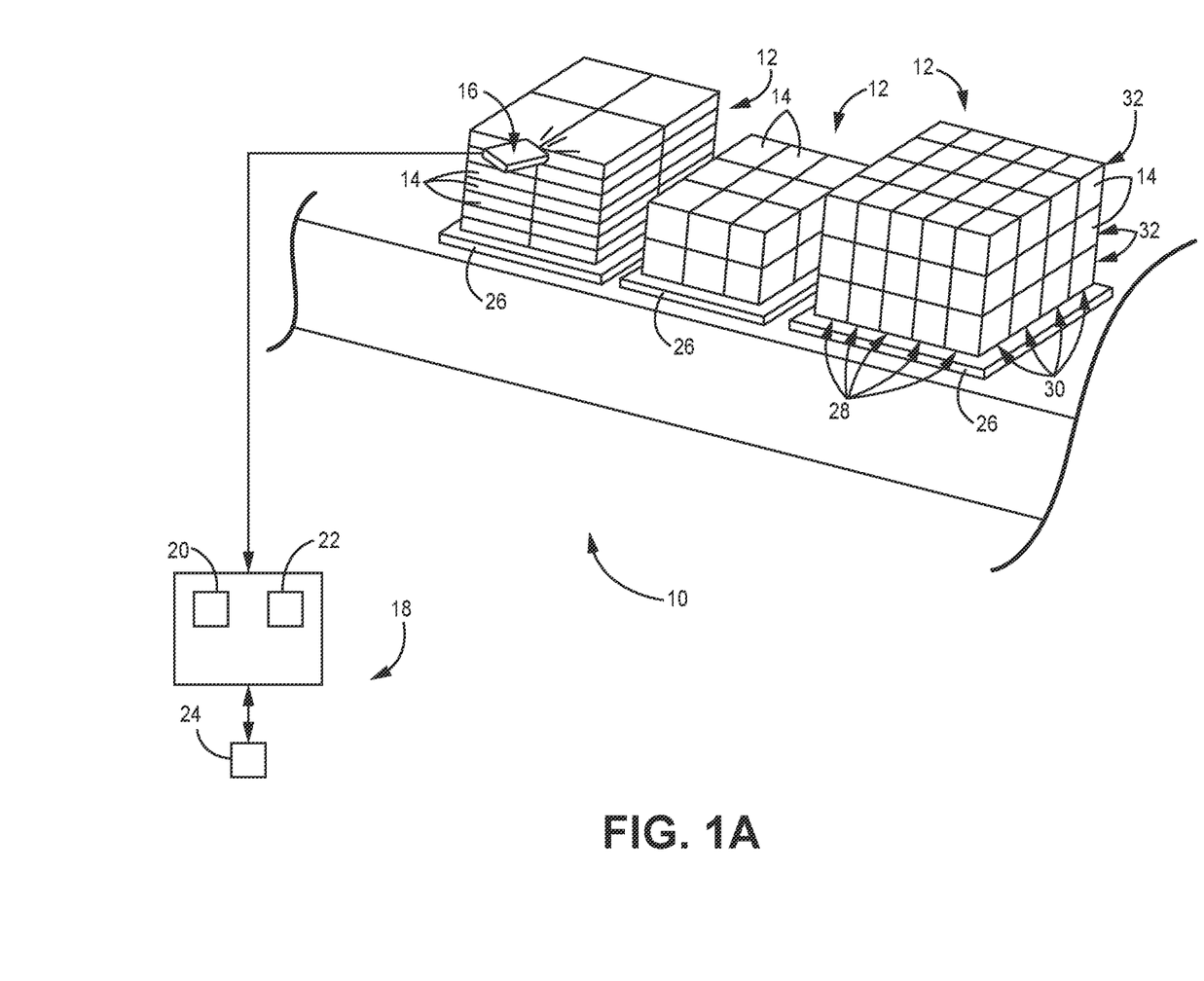
FIG. 1A is a partial block diagram of a cycle counting system.
Figure 1B:
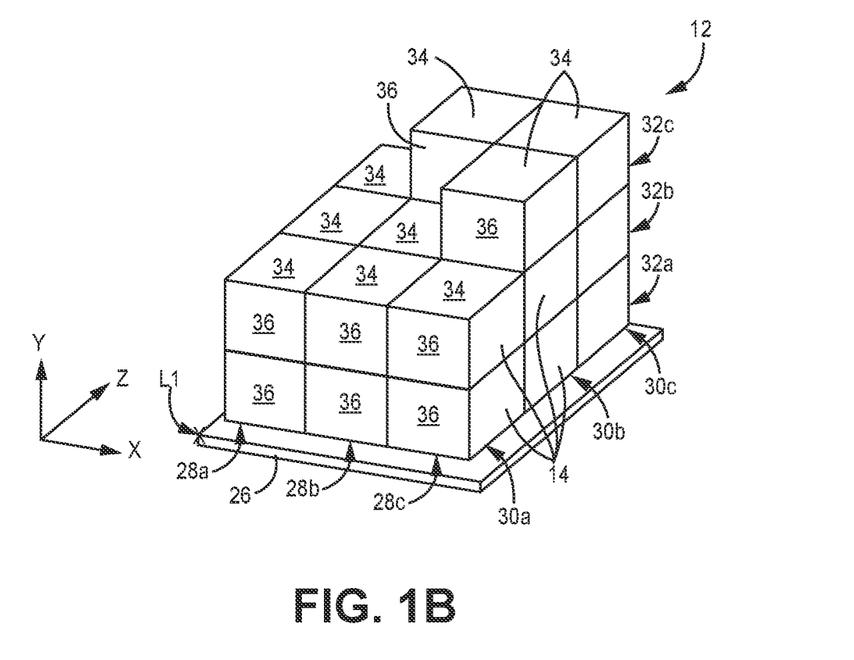
FIG. 1B is an isometric view of a grouping of physical product.

FIG. 1A is a block diagram of cycle counting system 10. FIG. 1B is an isometric view of a grouping 12 of physical product 14. Cycle counting system 10 is configured to generate product counts of individual physical product 14 within a physical system, such as a warehouse. Cycle counting system 10 is configured to generate counts of individual physical product 14 within groupings 12 of physical product 14. Cycle counting system 10 includes image-capture device 16 and cycle counter 18. Cycle counter 18 includes control circuitry 20, memory 22, and user interface 24.

Cycle counting system 10 can generate product counts for individual groupings 12 of physical product 14 disposed on various support surfaces 26. For example, cycle counting system 10 can generate product counts for groupings 12 of physical product 14 disposed on individual pallets. Cycle counting system 10 can, in some examples, generate overall counts of one or more of the types of physical product 14 within the physical system. In some examples, cycle counting system 10 can generate discrete product counts for individual groupings 12 of physical product 14 within the physical system and can generate overall product counts based on the various discrete product counts. For example, cycle counting system 10 can aggregate the discrete product counts from multiple pallets of a first product, each pallet forming a grouping 12 of the first product, to generate a system-wide overall product count for that first product.

Image-capture device 16 is configured to generate image data regarding groupings 12 of the physical product 14. For example, image-capture device 16 can be configured to generate two-dimensional images of the grouping 12. Image-capture device 16 can be, for example, a camera on a smart phone, a camera on a tablet computer, a dedicated camera device, or any other type of optical device suitable for capturing an image of the physical grouping 12. Image-capture device 16 can be manipulated and operated by a user, such as a human user, or can be mounted to another device, such as a vehicle. In some examples, image-capture device 16 can be and/or be part of an autonomous device configured to navigate the physical space and generate image data regarding one or more of the various groupings 12.

A physical size (e.g., volume, count of products, etc.) of the grouping 12 of the physical products (e.g., the filled or partially filled pallet of the physical products 14) can be determined by cycle counter 18 based on the captured image data from image-capture device 16 and, in some examples, based on received product information regarding the physical product 14. For example, the product information can include, among others, physical dimension information of the physical product 14 (e.g., physical dimensions of the boxes) provided via, e.g., a spreadsheet or other application. In some examples, physical dimensions of the grouping 12 of the physical product 14 can be determined based on an amount of the captured image data occupied by the grouping 12, a known field of view of the image-capture device 16 (e.g., an angle of the optical field of view of a camera), and a known distance between the aggregation and the image-capture device 16 while the image was captured. Cycle counting system 10 can be configured such that image-capture device 16 is disposed at the same or similar orientation relative to the grouping 12 each time the image data is captured for that type of grouping 12 and/or physical product 14. Cycle counter 18 can include one or more computer vision models trained on baseline image data corresponding to the physical products forming the grouping 12 of interest.

Cycle counter 18 is configured to generate product counts based on image data regarding the grouping 12 of the physical product 14. Cycle counter 18 is configured to store software, implement functionality, and/or process instructions. Cycle counter 18 can be of any suitable configuration for gathering data, processing data, etc. Cycle counter 18 can receive inputs, provide outputs, determine product counts based on image data, and output product count information. Cycle counter 18 can be configured to receive inputs and/or provide outputs via user interface 24. Cycle counter 18 can include hardware, firmware, and/or stored software, and cycle counter 18 can be entirely or partially mounted on one or more circuit boards.

In some examples, cycle counter 18 can be configured to implement computer-readable instructions that can take the form of a computer vision (CV) or machine vision model that utilizes machine learning to analyze, understand, and/or respond to digital images or video. The application of deep learning algorithms to input from image-capture device 16 can enable visual information to be converted into data that can be processed and evaluated for patterns. By analyzing a selection of images, machine learning models (e.g., neural networks, among other options) can be trained to recognize, classify and react to the image data. Retraining of the neural network or other machine learning model to account for aspects such as changing environmental conditions (e.g., lighting changes) can increase accuracy and reliability of the resulting output from the model. The computer vision or machine vision model can be trained on baseline image data corresponding to the physical product 14 that forms the grouping of interest.

While cycle counter 18 is shown as a discrete assembly, it is understood that cycle counter 18 can be formed by one or more devices capable of individually or collectively implementing functionalities and generating and outputting data as discussed herein. Cycle counter 18 can be considered to form a single computing device even when distributed across multiple component devices. Cycle counter 18 is configured to perform any of the functions discussed herein, including receiving an output from any source referenced herein, detecting any condition or event referenced herein, and generating and providing data and information as referenced herein. Cycle counter 18 can be of any type suitable for operating in accordance with the techniques described herein. In some examples, cycle counter 18 can be implemented as a plurality of discrete circuitry subassemblies. In some examples, cycle counter 18 can include a smartphone or tablet, among other options.

Control circuitry 20, in one example, is configured to implement functionality and/or process instructions. For example, control circuitry 20 can be capable of processing instructions stored in memory 22. Examples of control circuitry 20 can include one or more of a processor, a microprocessor, a controller, a digital signal processor (DSP), an application specific integrated circuit (ASIC), a field-programmable gate array (FPGA), or other equivalent discrete or integrated logic circuitry. Control circuitry 20 can be entirely or partially mounted on one or more circuit boards.

Cycle counter 18 can be communicatively coupled to image-capture device 16 in any desired manner, either directly or indirectly. In some examples, cycle counter 18 can include communications circuitry configured to facilitate wired or wireless communications. For example, the communications circuitry can facilitate radio frequency communications and/or can facilitate communications over a network, such as a local area network, wide area network, cellular network, and/or the Internet. In some examples, cycle counter 18 can be directly communicatively coupled to image-capture device 16 to receive the image data directly from image-capture device. In some examples, cycle counter 18 can be indirectly communicatively coupled to image-capture device 16 via one or more intermediate devices to receive the image data. For example, both image-capture device 16 and cycle counter 18 can be communicatively coupled to via the cloud or a central server, among other options.

Memory 22 can be configured to store information before, during, and/or after operation. Memory 22, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 22 is a temporary memory, meaning that a primary purpose of memory 22 is not long-term storage. Memory 22, in some examples, is described as volatile memory, meaning that memory 22 does not maintain stored contents when power to cycle counter 18 is turned off. Examples of volatile memories can include random access memories (RAM), dynamic random access memories (DRAM), static random access memories (SRAM), and other forms of volatile memories. In some examples, memory 22 is used to store program instructions for execution by control circuitry 20. Memory 22, in one example, is used by software or applications running on cycle counter 18 to temporarily store information during program execution.

Memory 22, in some examples, also includes one or more computer-readable storage media. Memory 22 can be configured to store larger amounts of information than volatile memory. Memory 22 can further be configured for long-term storage of information. In some examples, memory 22 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 24 can be configured as an input and/or output device. For example, user interface 24 can be configured to receive inputs from a data source and/or provide outputs regarding product counts. Examples of user interface 24 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Figure 2:
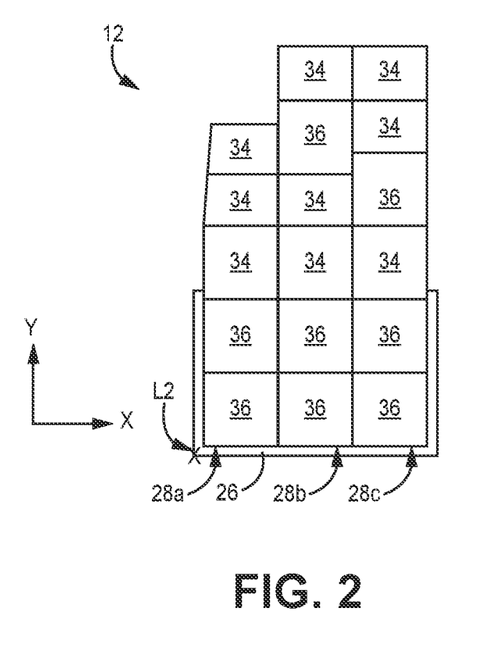
FIG. 2 is a front view of the grouping of physical product shown in FIG. 1B.
Figure 3A:
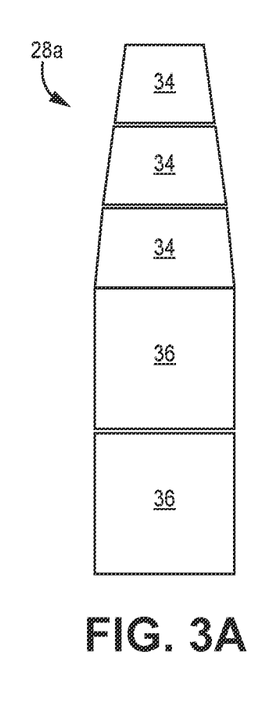
FIG. 3A is a front view showing ordered visible surfaces of a first row of physical product of the grouping shown in FIG. 2.
Figure 3B:
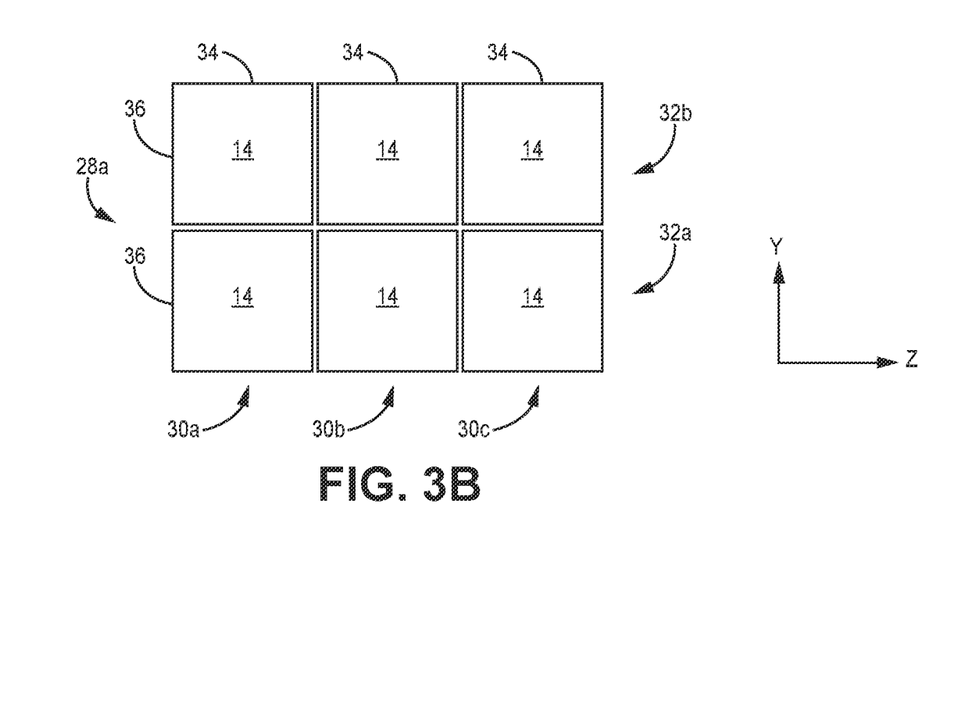
FIG. 3B is a side view showing the physical product forming the first row shown in FIG. 3A.
Figure 4A:
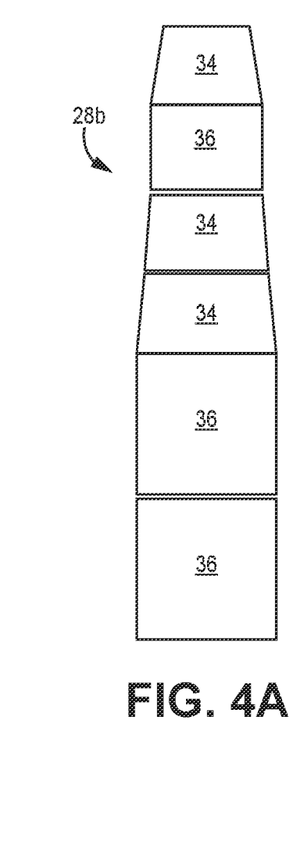
FIG. 4A is a front view showing ordered visible surfaces of a second row of the physical product of the grouping shown in FIG. 2.
Figure 4B:
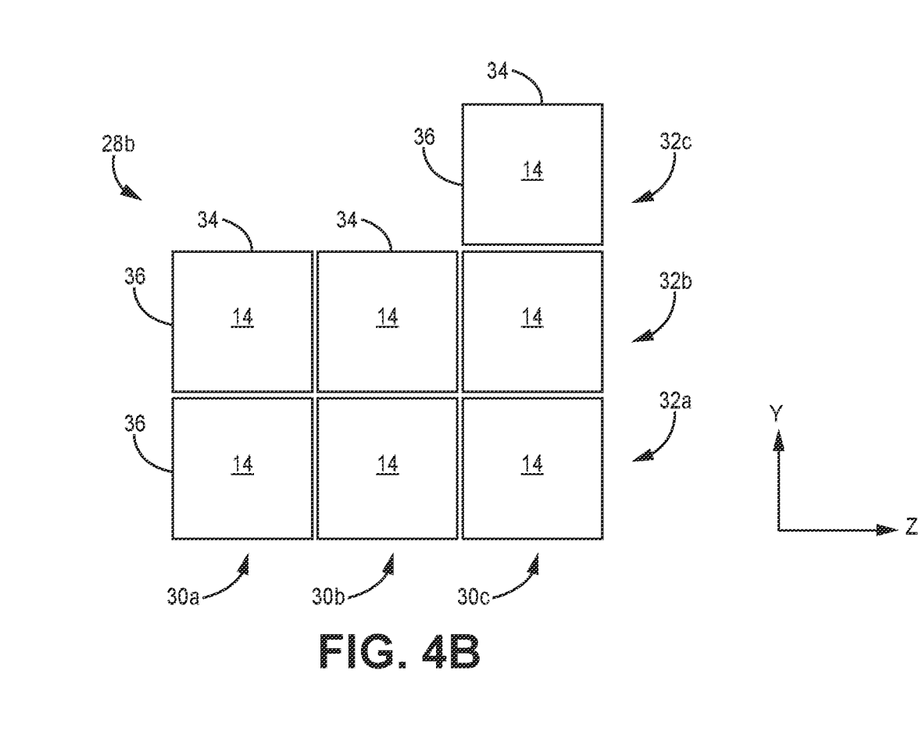
FIG. 4B is a side view showing the physical product forming the second row shown in FIG. 4A.
Figure 5A:
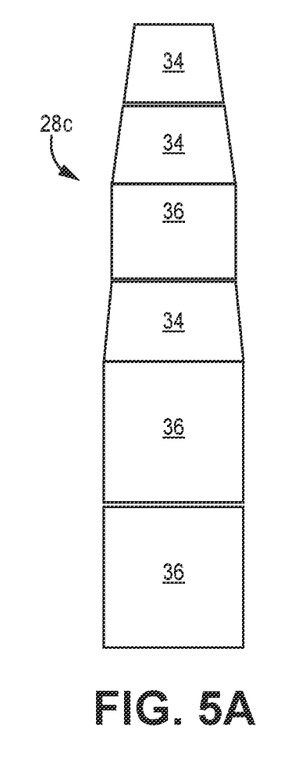
FIG. 5A is a front view showing ordered visible surfaces of a third row of the physical product of the grouping shown in FIG. 2.
Figure 5B:
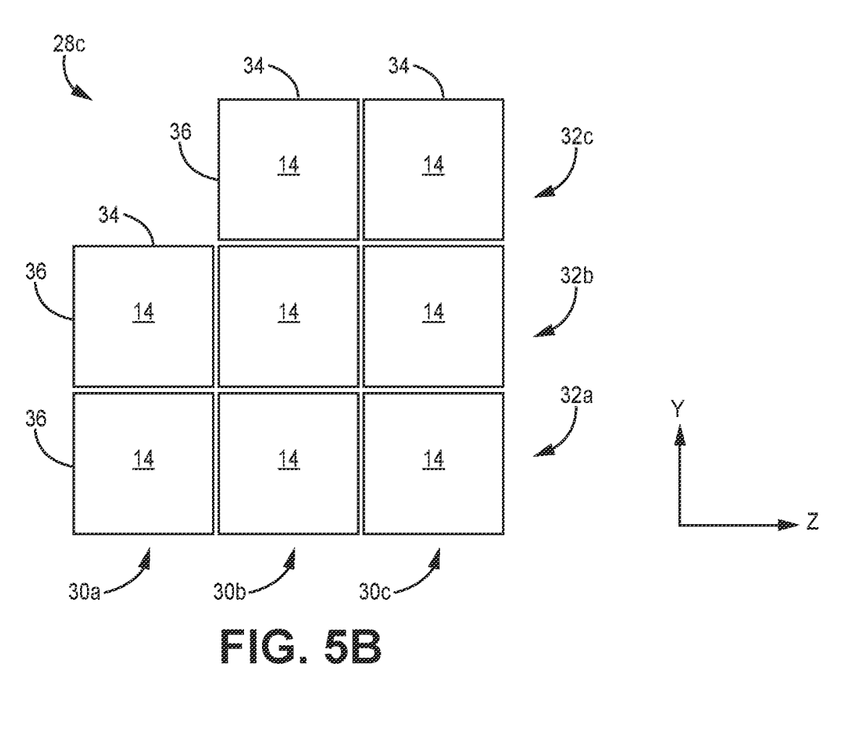
FIG. 5B is a side view showing the physical product forming the third row shown in FIG. 5A.

Groupings 12 of physical product 14 are arranged in rows 28a-28c (collectively herein "row 28" or "rows 28"), columns 30a-30c (collectively "column 30" or "columns 30"), and layers 32 (collectively herein "layer 32" or "layers 32"). In the example shown, rows 28 stack laterally along the width of the grouping 12, columns 30 stack longitudinally along the depth of the grouping 12, and layers 32 stack vertically along the height of the grouping 12. FIG. 2 is a front view of the grouping 12 of physical product 14 shown in FIG. 1B. FIG. 3A is a front view showing ordered visible surfaces of a first row 28a of physical product 14 of the grouping 12 shown in FIG. 2. FIG. 3B is a side view showing the physical product 14 forming the first row 28a shown in FIG. 3A. FIG. 4A is a front view showing ordered visible surfaces of a second row 28b of the physical product 14 of the grouping 12 shown in FIG. 2. FIG. 4B is a side view showing the physical product 14 forming the second row 28b shown in FIG. 4A. FIG. 5A is a front view showing ordered visible surfaces of a third row 28c of the physical product 14 of the grouping 12 shown in FIG. 2. FIG. 5B is a side view showing the physical product 14 forming the third row 28c shown in FIG. 5A. FIGS. 2-5B will be discussed together and with continued reference to FIGS. 1A and 1B.

In the example shown in FIG. 1B and FIG. 2, the grouping 12 of interest includes three rows 28, three columns 30, and three layers 32. It is understood that the actual count of rows 28, columns 30, and layers 32 may not correspond to a theoretical maximum count of the rows 28, columns 30, and layers 32 of the physical product 14 forming the grouping 12. For example, the grouping 12 may be configured to have four rows 28, three columns 30, and four layers 32, but the physical product 14 forming one of the rows 28 and one of the layers 32 could have been removed. In the example shown, several of the physical product 14 forming the third layer 32c of the grouping 12 of interest have been removed.

An image of grouping 12 of physical product 14, such as a filled or partially filled pallet of a plurality of the physical product 14 (e.g., individual boxes) is captured by image-capture device 16. Image-capture device 16 thereby generates captured image data. FIG. 2 is a view representative of the captured image data for grouping 12 shown in FIG. 1B.

The captured image data is a two-dimensional image of the grouping 12. The captured image data is provided to cycle counter 18.

Cycle counter 18 generates product counts of the number of physical products 14 in a grouping 12 based on the captured image data generated by image-capture device 16. The captured image data is and/or includes and/or represents a two-dimensional representation of grouping 12. Often, at least some of the physical products 14 forming the grouping 12 are not visible in the single image, such as when certain of the products are underneath others of the products in the field of view of the image-capture device 16, behind others of the products 14 in the field of view of the image-capture device 16, obscured by wrapping, or otherwise not visible and/or discernable from the captured image data generated by the image-capture device 16. Cycle counter 18 generates an accurate product count based on the captured image data even when one or more of the products 14 in the grouping 12 are not visible and/or discernable from the image. The captured image data is a single image of grouping 12. It is understood that the single image can be formed from an aggregation of multiple images that together form the single image.

Various surfaces of the physical products 14 are visible in the captured image data, which surfaces can be referred to as visible surfaces. The portions of the physical products 14 forming the visible surfaces can be classified as horizontal portions 34 (e.g., the tops of the physical product 14) or vertical portions 36 (e.g., the sides facing the image-capture device 16, which can also be referred to as the fronts). The visible surfaces are formed by at least some of the physical product 14 in the grouping 12. Image-capture device 16 can be configured to generate the captured image data such that each exposed horizontal portion 34 within grouping 12 is visible in the captured image data. Image-capture device 16 can thus be configured to capture the image data such that the tops of the vertically uppermost physical product 14 in each row/column location is visible. Image-capture device 16 is spaced longitudinally from grouping 12 to generate the captured image data. The captured image data can exclude the lateral sides of the grouping 12 and the opposite longitudinal size (e.g., back) of the grouping 12. The front and top of the grouping 12 are shown. The uppermost horizontal portions 34 are visible in the captured image data but, as discussed in more detail below, the vertical portions 36 do not need to be visible for cycle counter 18 to generate an accurate product count. Grouping 12 and at least a portion of a support surface 26 of that grouping 12 are visible in the captured image data. For example, the grouping 12 can be disposed on a pallet, a ground surface, a table, a shelf, etc. that forms the support surface 26.

Product information corresponding to the physical products 14 (e.g., boxes, cans, etc.) can be utilized by cycle counter 18 to generate the product count. Such product information can include physical dimension information of the product (e.g., physical dimensions of the boxes or cans, etc.). In some examples, the product information can correspond to the physical configuration of a baseline grouping 12. For example, the product information can include a theoretical maximum product count, which is the maximum number of physical product 14 that can fit in a physical grouping 12 (e.g., maximum number of boxes forming the physical product 14 that can fit on the support surface 26).

Cycle counter 18 can receive or recall from memory 22 product information based on the physical product 14 actually forming the grouping 12 of interest. For example, cycle counter 18 can recall the dimensions of the physical product 14, the maximum count of physical product 14 constituting a full grouping 12, etc. from memory 22 or receive such product information from another device. Cycle counter 18 can utilize the product information to identify and classify the visible surfaces of the physical products 14. For example, cycle counter 18 can utilize the product information to identify the relative three-dimensional location of each visible surface and classify the visible surfaces as forming a horizontal portion 34 or a vertical portion 36.

In some examples, cycle counter 18 can receive and/or recall the product information based on the captured image data. For example, the cycle counter 18 can be configured to recall the product information based on identifying data from an identifier contained in the captured image data. The identifier can be a barcode, text, Quick Response (QR) code, symbol, or other marking that uniquely identifies the physical product 14. Cycle counter 18 can be configured to identify the identifier in the captured image data and recall the product information based on the identifying data provided by the identifier (e.g., the identifying data contained in the captured image data).

In some examples, the identifying data can be provided to cycle counter 18 separate from the captured image data, such as by image-capture device 16 separate from the captured image data or by a device other than image-capture device 16. For example, the identifier can be placed next to a grouping 12 of physical product 14 (e.g., on the rail of a shelf holding the grouping 12). The identifier can be scanned, by the image-capture device 16 or by another component (e.g., a smartphone, tablet, or other scanner) and the scanned identification data provided to cycle counter 18.

In some examples, the identifier can be configured to passively provide the product information to cycle counter 18. For example, the identifier can be configured as a proximity device (e.g., near field communication (NFC) device, active RFID (e.g., Active Reader Active Tag), passive RFID (e.g., Active Reader Passive Tag), NFCIP-1, ISO/IEC 18092, etc.). The identifier can provide the identification data based on image-capture device 16, or another reader, being within a threshold distance of the identifier. In some examples, image-capture device 16 can include an RFID or NFC reader configured to receive the identification data from the identifier. The identifier can be mounted on or near the pallet supporting the grouping 12 of physical products 14 and can include relevant product information for the physical product 14 of that grouping 12. The identification data can be transmitted to cycle counter 18. Cycle counter 18 can recall product information regarding the physical product 14 forming the grouping 12 based on the identification data (e.g., from memory 22). While cycle counter 18 is described as recalling the product information based on the identification data, it is understood that, in some examples, the identifier can directly provide the product information to cycle counter 18.

Cycle counter 18 can configure the captured image data such that the captured image data is directed to the relevant grouping 12. For example, the captured image data may include portions of groupings disposed adjacent to the grouping 12 of interest. Those portions may show portions of the same or different physical product to the physical product 14 forming the grouping 12 of interest. Cycle counter 18 configures the captured image data to remove extraneous data and information, such as boxes that are adjacent to grouping 12 but not part of grouping 12. For example, the two-dimensional image constituting the captured image data can be cropped to the width of the support surface 26 (e.g., a pallet) of grouping 12. The configured image data can thereby have a smaller image area, which is the area of the image data in the two-dimensional space, compared to the captured image data. The configured image data can contain fewer pixels than the captured image data. Configuring the captured image data based on the relevant physical grouping 12 eliminates product from other groupings that may be present in the captured image data. Configuring the captured image data eliminates product from those adjacent groupings from the image data used for the product count. The configured image data is fit to the relevant grouping 12 and thus facilitates an accurate product count and eliminates possible sources of count error by limiting the product visible in the configured image data to the physical product 14 forming the relevant grouping 12. While the following discussion references the captured image data, it is understood that the discussion is equally applicable to using the configured image data to generate a product count, unless otherwise noted.

Cycle counter 18 can be configured to implement a first computer vision model to generate the configured image data based on the captured image data. The first computer vision model can also be referred to as a configuration computer vision model. The configuration computer vision model can be an object identification computer vision model configured to identify a subset of the image data containing the object(s) of interest. In the example discussed, the objects of interest for the configuration computer vision model is the grouping 12, and in some examples the support surface. The configuration computer vision model can be trained to recognize, classify and react to the captured image data. The configuration computer vision model can be trained on baseline image data to identify the grouping 12 and configure the captured image data. The baseline image data can be a selection of images of the physical product 14 and/or grouping 12 of the physical product 14 taken from similar perspective as the captured image data. The baseline image data can correspond to the physical parameters of the physical product 14 or a grouping 12 of physical product 14. In some examples, the configuration computer vision model can be a neural network trained on the baseline image data. Machine learning models can be trained to process information at high speeds, and in light spectrums, such as ultra-violet (UV) or infrared, that would otherwise be invisible to the human eye. As such, machine learning computer vision models can accurately and reliably count, identify, and analyze products within image data of the products, in some cases utilizing image data that is not typically visible to the human eye.

Cycle counter 18 identifies the visible surfaces of the physical product 14, which can be either horizontal surfaces 34 or vertical surfaces 36, based on the captured image data. Cycle counter 18 can be configured to identify and/or generate a boundary for each visible surface to thereby identify the visible surface. The visible surfaces identified by cycle counter 18 can be referred to as identified visible surfaces and/or as bounded visible surfaces.

Cycle counter 18 can implement a second computer vision model to identify the visible surfaces. The second computer vision model can also be referred to as a recognition computer vision model. The recognition computer vision model can be an object identification computer vision model configured to identify a subset of the image data containing the object(s) of interest. In some examples, the recognition computer vision model can be configured to identify a subset of the captured image data containing the object(s) of interest. In examples including the configuration computer vision model, the recognition computer vision model can be configured to identify a subset of the configured image data generated by the configuration computer vision model and containing the object(s) of interest. In the examples discussed, the objects of interest for the recognition computer vision model are the visible surfaces of the physical product 14, which visible surfaces form the horizontal portions 34 and vertical portions 36 of the physical products 14.

The recognition computer vision model can be trained to recognize, classify and react to the captured image data. The recognition computer vision model can be trained on baseline image data to identify, and in some examples classify, the visible surfaces within the captured image data. The baseline image data can be a selection of images of the physical product 14 and/or grouping 12 of the physical product 14 taken from similar perspective as the captured image data. The baseline image data can correspond to the physical parameters of the physical product 14. For example, image-capture device 16 can be utilized to capture the images forming the baseline image data. The captured image data can be generated at the same or similar orientation as the baseline image data (e.g., same height and angle of the camera, same position relative to grouping 12 such as along the width of grouping and distance spaced away from the grouping 12, etc.). In some examples, the recognition computer vision model can be a neural network trained on the baseline image data. Machine learning models can be trained to process information at high speeds, and in light spectrums, such as ultra-violet (UV) or infrared, that would otherwise be invisible to the human eye. As such, machine learning computer vision models can accurately and reliably count, identify, and analyze products within image data of the products, in some cases utilizing image data that is not typically visible to the human eye.

The recognition computer vision model can, in some examples, be configured to identify the surfaces of the physical product 14 based on bounding boxes. For example, the recognition computer vision model can be configured to apply bounding boxes to the relevant portions of the captured image data associated with the visible surfaces. Each bounding box is associated with a relevant, visible surface of the physical product 14 (e.g., associated with one of a horizontal portion 34 and a vertical portion 36). The bounding boxes are rectangular and bound the relevant portions of the captured image data. It is understood that each bounding box may include less than all of the relevant surface of the physical product 14 and/or may contain portions of the captured image data other than the relevant surface of the physical product 14.

The recognition computer vision model can, in some examples, be configured to identify the visible surfaces of the physical product 14 based on pixel masking. Pixel masking is a machine learning technique that attempts to identify only those pixels that correspond to the target object. Pixel masks, unlike bounding boxes, may not be rectangular and can thus be more representative of the target object (e.g., the visible surfaces of the physical products 14).

In some examples, product count and/or identification operations can utilize product labeling features or other product features included in the captured image data. For instance, labels on, e.g., cans or boxes forming the physical product 14, can be identified in the captured image data to ensure that the physical products 14 are aligned correctly. In certain examples, identification of product labels within the captured image data can be cross-checked with, for example, a reference label to ensure that the correct labels are on the physical product 14. In some examples, size, shape, or other product information for a physical product 14 can be utilized by cycle counter 18 to identify the presence of a physical product within the captured image data that does not match a reference physical product (or products) expected to be within the grouping 12. The recognition computer vision model can be trained to identify a reference physical product (or products) within the captured image data based on product information of the reference physical product, such as size, dimensions, shape, or other visibly identifiable features. Cycle counter 18 can identify physical products that are misplaced or otherwise out of position within the grouping 12. In some examples, cycle counter 18 can provide an alert or other action in response to detecting the non-conforming product.

The recognition computer vision model can, in some examples, be configured to classify each identified visible surface as being one of vertical (e.g., formed by a vertical portion 36) and horizontal (e.g., formed by a horizontal portion 34), thereby generating classified visible surfaces. For example, the recognition computer vision model can be trained on baseline data to classify each of the identified visible surfaces as being one of a vertical portion 36 and a horizontal portion 34. While cycle counter 18 is described as classifying the identified visible surfaces by the recognition computer vision model, it is understood that, in some examples, cycle counter 18 can be configured to classify the identified visible surfaces as one of vertical and horizontal based on a coordinate comparison, as discussed in more detail below. Cycle counter 18 can determine an ordering of the vertical portions 36 and horizontal portions 34 from lowermost layer 32 (e.g., layer 32a) to uppermost layer 32 (e.g., layer 32c) within each row 28. An ordering of the classified visible surfaces can be used to determine a volume of physical product 14 in grouping 12, as discussed in more detail below.

Cycle counter 18 is configured to generate and assign image coordinates to each of the identified visible surfaces. The image coordinates are two-dimensional coordinates generated for each identified surface in the two-dimensional space of the captured image data. Each image coordinate can be associated with a single one of the identified visible surfaces. In some examples, cycle counter 18 identifies a centroid or other common location associated with each identified visible surface and coordinates are applied to the centroids to provide the image coordinates for that visible surface. The image coordinates are two-dimensional coordinates that are based, at least in part, on the captured image data. It is understood that, while cycle counter 18 is described as generating and assigning image coordinates to identified visible surfaces, cycle counter 18 can generate and assign image coordinates to classified visible surfaces such that the discussion of image coordinates is applicable to classified visible surfaces, unless otherwise noted.

The image coordinates can be based on an anchor point generated by cycle counter 18. Cycle counter 18 can generate the anchor point and apply the anchor point to the image data. The anchor point provides a reference location for generating the image coordinates for the identified visible surfaces. For example, the anchor point can provide a coordinate origin for locating relevant points within the captured image data. The image coordinates are taken relative to the coordinate origin. The coordinate origin can be located along the front of the support surface 26. In some examples, the coordinate origin can be located at a front corner of the support surface 26, such as the left front corner of a pallet or the right front corner of a pallet. The image coordinates locate each visible surface within a two-dimensional space. The image coordinates are coordinates in an X-Y plane (as shown in FIGS. 1B and 2). The image coordinates thereby provide locating information regarding the identified visible surfaces vertically and laterally relative to the coordinate origin.

Cycle counter 18 is configured to generate the product count of the physical product 14 in the physical grouping 12 based on a coordinate comparison. Cycle counter 18 generates base coordinates regarding the grouping 12. The base coordinates are virtual coordinates in a three-dimensional space. For example, cycle counter 18 can generate a virtual product grouping, which is a three-dimensional virtual representation of grouping 12. The virtual product grouping can be based on the product information regarding the physical product 14 forming that grouping 12. For example, cycle counter 18 can recall (e.g., from memory 22) the product information for the physical product 14 forming the grouping 12 of interest. The virtual product grouping, which can also be referred to as a reference grouping, can be based on the volume of product occupying a full grouping 12. In some examples, the three-dimensional virtual representation can include fully occupied rows 28, columns 30, and layers 32 based on the product information. For instance, the virtual product grouping can be formed as a maximum number of the physical product 14 that can fit within the defined volume of the virtual product grouping (e.g., a full pallet shipping volume). In some examples, cycle counter 18 can be configured to generate the virtual product grouping based on product information derived from the captured image data. For example, cycle counter 18 can determine base product sizes from the bounded visible surfaces and generate the virtual product grouping based on that derived product information.

Cycle counter 18 generates base coordinates for the virtual products forming the virtual product grouping. For example, cycle counter 18 can generate base coordinates for each relevant surface (e.g., the virtual surfaces corresponding to the horizontal portions 34 and vertical portions 36 of the physical products 14) of each virtual product in the reference grouping. The base coordinates are associated with the virtual products forming the virtual product grouping. More specifically, the base coordinates can be associated with the virtual surfaces of the virtual products that are representative of the actual visible surfaces of the physical product 14. The base coordinates of the virtual products provide information regarding the expected locations of each physical product 14 in a grouping 12 laterally, longitudinally, and vertically relative to the coordinate origin.

The base coordinates can be based on the anchor point. For example, if the anchor point is established at the front left corner of a pallet in the two-dimensional space (e.g., at location L2 in FIG. 2), then the anchor point can also be located at the front left corner of the pallet in the three-dimensional space (e.g., at location L1 in FIG. 1B). The image coordinates and the base coordinates are thereby generated based on a common location between the two-dimensional space of the captured image data and the three-dimensional space of the virtual product grouping.

Cycle counter 18 generates the base coordinates based in part on the configuration of the image coordinates. For example, if the image coordinates are based on the centroids of the identified visible surfaces, then the base coordinates can also be based on centroids. In some examples, the image coordinates are the centroids of the vertical portions 36 and horizontal portions 34 based on the two-dimensional captured image data and the base coordinates are the centroids of the vertical portions 36 and the horizontal portions 34 in the three-dimensional virtual product grouping.

Cycle counter 18 associates the identified visible surfaces of the physical product 14 with the three-dimensional locations of the virtual surfaces of the virtual products forming the virtual product grouping. Cycle counter 18 is configured to associate the identified visible surfaces and the virtual surfaces based on the image coordinates and the base coordinates. The image coordinates are compared with the base coordinates based on the vertical coordinate (Y coordinate) and lateral coordinate (X coordinate) of the image coordinates and the vertical coordinate and the lateral coordinate of the base coordinates. For example, cycle counter 18 can associate the identified visible surfaces and the virtual surfaces based on a best fit between the image coordinates and the base coordinates. Cycle counter 18 can compare the coordinates of the centroids of the identified visible surfaces (e.g., the image coordinates) with the coordinates of the centroids of the virtual surfaces (e.g., the base coordinates) to associate the two-dimensional identified visible surfaces with the location of a virtual surface that includes a longitudinal coordinate (the Z-coordinate) in three-dimensional space.

The closest image coordinate to a base coordinate based on the comparison of the vertical and lateral coordinates can be associated with that base coordinate. In some examples, the image coordinates can be associated with the base coordinates only when the distance between the image coordinate and the base coordinate in the two-dimensional comparison is within a threshold distance. The comparison between the image coordinates of the identified visible surfaces and the base coordinates of the virtual surfaces associates a longitudinal coordinate with each image coordinate. Cycle counter 18 associates the identified virtual surface with the location of a particular virtual product representative of a particular physical product 14 in the physical grouping 12 based on the third dimensional coordinate provided by the associated base coordinate. The identified visible surfaces are thereby associated with locations in the three-dimensional space of the product grouping 12.

The comparison between the image coordinates and the base coordinates provides a third dimensional coordinate to the image coordinates, thereby locating the visible surface associated with the image coordinate in the three-dimensional space. Some examples of cycle counter 18 are configured to classify the identified visible surfaces as being a vertical portion 36 or a horizontal portion 34 (e.g., classified by the recognition computer vision model) prior to associating the base coordinates and the image coordinates. The comparison between the image coordinates and the base coordinates can be based on the classified visible surfaces and the ones of the virtual surfaces having the same classification (e.g., as horizontal or vertical) as the classified visible surfaces. For example, the image coordinates of the visible surfaces classified as horizontal can be compared with the base coordinates of the virtual horizontal portions. Similarly, the image coordinates of the visible surfaces classified as vertical can be compared with the base coordinates of the virtual vertical portions. Located visible surfaces are the visible surfaces that have been associated with a longitudinal coordinate within the three-dimensional space.

In some examples, cycle counter 18 is configured to classify the identified visible surfaces based on the associations between the image coordinates and the base coordinates. Cycle counter 18 can thereby classify the identified visible surfaces based on a coordinate comparison. For example, the angle at which image-capture device 16 is disposed relative to the grouping 12 when generating the captured image data can lead to closely located base coordinates in the two-dimensional space for different ones of the virtual products in the virtual grouping. For example, the X value and the Y value of the centroid of the horizontal portion 34 of a virtual product located in row 28a, column 30a, layer 32b may be close to the X value and the Y value for the centroid of the vertical portion 36 of the virtual product located in row 28a, column 30b, layer 32b, at certain view angles of image-capture device 16. Cycle counter 18 can classify the identified visible surfaces based on an identification order, such as vertically from the lowermost to the uppermost within a single row 28 before moving to the next row. In the present example shown in FIGS. 1B and 2, the identified visible surface can be classified as the horizontal surface 34 of the product in row 28a, column 30a, layer 32b rather than the vertical surface 36 of the product in row 28a, column 30b, layer 32b based on cycle counter 18 having already identified the vertical surface 36 of the product disposed at row 28a, column 30a, layer 32b. Cycle counter 18 determines that a first physical product 14 is present in row 28a, column 30a, layer 32b such that the vertical surface 36 of the second physical product 14 in row 28a, column 30b, layer 32b is disposed behind and obscured by the first physical product 14, and such surface is thus not visible in the captured image data. Some examples of cycle counter 18 can classify each of the identified visible surfaces as vertical or horizontal based on the coordinate comparison. The classified visible surfaces are located by the associated image coordinates and base coordinates.

Cycle counter 18 can determine the product count based on an identification order of the visible surfaces. The identification order can be based on the located visible surfaces. In some examples, the identification order can be based on identifying the volume of each row 28 of the physical grouping 12 prior to the next row 28 in the physical grouping 12 (e.g., identifying the volume of row 28a before the volume of row 28b). The identification order can additionally or alternatively be based on an order of the located visible surfaces from a vertically lowest layer 32 to a vertically highest layer 32 (e.g., shifting vertically from layer 32a upwards towards layer 32c) within the same row 28.

In the example shown, the ordering of the located visible surfaces in the first row 28a, shown in FIG. 3A, indicates, in order from lowermost to uppermost, vertical portion 36, vertical portion 36, horizontal portion 34, horizontal portion 34, horizontal portion 34. Cycle counter 18 determines that the first row 28a includes two layers 32a, 32b and three columns 30a-30c based on the ordering of the located visible surfaces forming the first row 28a. The physical product 14 forming the second layer 32b must be supported by additional physical product 14 disposed below the physical product 14 forming that upper layer 32b. The supporting physical product 14 is not shown in the captured or baseline image data. Based on the ordering of the visible surfaces, cycle counter 18 determines that first row 28a includes a total of six physical product 14, including the four physical product 14 that are visible in the captured image data and the two lower, support ones of physical product 14 that are not visible in the captured image data, as shown in FIG. 3B. Cycle counter 18 thereby determines a product count of six for first row 28a.

Cycle counter 18 generates product counts for each row 28 in the grouping 12 based on the ordered vertical portions

36 and horizontal portions 34. In the example shown, the ordering of the located visible surfaces forming the second row 28b, shown in FIG. 4A, indicates, in order from lowermost to uppermost, vertical portion 36, vertical portion 36, horizontal portion 34, horizontal portion 34, vertical portion 36, horizontal portion 34. Based on the ordering of the located visible surfaces in the second row 28b, cycle counter 18 determines that second row 28b includes three columns 30a-30c, with the first two columns 30a, 30b each including two layers 32a, 32b and the third column 30c including three layers 32a-32c. Based on the ordering of the visible surfaces, cycle counter 18 determines that second row 28b includes a total of seven of physical product 14, including the four physical product 14 that are visible in the captured image data and the three lower, support ones of physical product 14 that are not visible in the captured image data, as shown in FIG. 4B. Cycle counter 18 thereby determines a product count of seven for the second row 28 in grouping 12.

The ordering of the located visible surfaces forming the third row 28c, shown in FIG. 5A, indicates, in order from lowermost to uppermost, vertical portion 36, vertical portion 36, horizontal portion 34, vertical portion 36, horizontal portion 34, horizontal portion 34. Based on the ordering of the located visible surfaces of the third row 28c, cycle counter 18 determines that the third row 28c includes three columns 30a-30c, with the first column 30a including two layers 32a, 32b and the second and third columns 30b, 30c each including three layers 32a-32c. Based on the ordering of the visible surfaces, cycle counter 18 determines that third row 28c includes a total of eight physical product 14, including the four physical product 14 that are visible in the captured image data and the four lower, support ones of physical product 14 that are not visible in the captured image data, as shown in FIG. 5B. Cycle counter 18 thereby determines a product count of eight for the third row 28c in grouping 12.

As shown, while each of the rows 28a-28c include the same number of physical products 14 visible in the image data (four in the example shown), cycle counter 18 generates an accurate product count for each row 28a-28c that includes all product that are not visible in the captured image data but that form portions of the physical grouping 12. Further, while the second row 28b and the third row 28c both include the same number of visible surfaces, six as compared to four for first row 28a, cycle counter 18 accurately determines the different product count for the second row 28b based on the identified ordering of the identified visible surfaces forming each row 28. Cycle counter 18 generates the accurate product counts based on the classified visible surfaces and the ordering of those surfaces. Cycle counter 18 can thereby quickly and accurately generate product counts for various groupings of various physical products based on captured image data, which can take the form of a single image of the physical grouping.

Cycle counter 18 generates an overall product count for the physical grouping 12. For example, cycle counter 18 can sum the product counts for each row 28a-28c to generate the overall product count for grouping 12. In the example shown, cycle counter 18 determines an overall product count of twenty-one physical product 14 forming the grouping 12 shown in FIGS. 1B and 2.

Cycle counter 18 can generate product counts for groupings 12 of physical product 14 based on a single image of the grouping 12. Cycle counter 18 provides significant advantages. Cycle counter 18 generates product counts for groupings 12 based on a single, two-dimensional image of the grouping 12, which can quickly and efficiently be captured, particularly in large warehouses and similar environments. Cycle counter 18 can efficiently and quickly count inventory in the facility, such as a warehouse, based on the quickly and easily obtainable captured image data. Cycle counter 18 can generate product counts significantly quicker than typical hand counts conducted by workers. In addition, cycle counter 18 provides an accurate count across hundreds or thousands of physical products 14 and physical groupings 12, improving user confidence and providing accurate and efficient tracking of the physical product 14.

Cycle counter 18 can accurately generate product counts for groupings 12 where one or more of the outer surfaces (e.g., the vertical portions 36 and horizontal portions 34) are not visible in the captured image data. For example, portions of physical groupings 12 can be obscured such that various outer ones of the surfaces of the physical product 14 are not identifiable within the image data. For example, physical products 14 on pallets are often wrapped in plastic and only partially unwrapped as product is removed. Additional wrapping is removed as physical product 14 is removed from the physical grouping 12. The wrapping that remains on the grouping can obscure vertical portions 36 of lower ones of the layers 32 of the physical grouping 12, making identification of those visible surfaces difficult or impossible.

Associating the image coordinates with the base coordinates associates the identified visible surfaces, which are each associated with a physical product 14, with a virtual surface associated with a virtual product having a location in three-dimensional space. Associating image coordinates with base coordinates locates the identified visible surfaces within three-dimensional space by way of the longitudinal coordinate from the associated base coordinate. A located visible surface provides the location of a physical product 14 associated with the identified visible surface within the three-dimensional space of the physical grouping 12. Cycle counter 18 can determine that there are additional layers 32 in the physical grouping 12 below the lowermost visible layer 32 based on the three-dimensional location of the located visible surface. Any layers 32 below the identified layer 32 containing the located visible surface can be assumed to exist to physically support the physical product 14 associated with the located visible surface.

For example, cycle counter 18 can generate an accurate product count for a grouping 12 in which only horizontal portions 34 are visible in the captured image data. The horizontal portions 34 are located by cycle counter 18 within the three-dimensional space by the associated image coordinates and base coordinates. The located horizontal portions 34 identify the layer 32 of each physical product 14 associated with a located horizontal portion 34. Lower layers 32 that are disposed vertically below the layer 32 of the located horizontal portions 34, if any, are assumed to exist to support the physical product 14 in its identified layer 32. For example, if only a third layer 32 and fourth layer 32 are visible in captured image data (e.g., due to the first and second layers 32 being obscured), the cycle counter 18 will identify that the visible ones of physical product 14 are located in those third and fourth layers 32 by the located visible surfaces.

Conducting cycle counting for partially obscured physical groupings 12 is difficult and time consuming to accomplish as the counter cannot physically observe the product to conduct the count. An ordering of only the visible surfaces can lead to an inaccurate product count for partially obscured physical groupings by omitting the lower, obscured or partially obscured layers. Cycle counter 18 generates accurate product counts for physical groupings 12 that are obscured in the captured image data by associating the identified three-dimensional surfaces with virtual positions in three-dimensional space, thereby determining the configuration of the supporting physical product 14 below the visible ones of the physical product 14 in the captured image data. Computer vision models can also have less than perfect identification and recall. Cycle counter 18 accounts for such errors in the model by locating the identified visible surfaces in the three dimensional space, providing an accurate product count even when less than all of the outermost physical product 14 are visible.

Cycle counter 18 is configured to output the product count. For example, the product count of the number of the physical product 14 within the physical grouping 12 can be output for use within an inventory tracking system, among other options. In some examples, cycle counter 18 can be considered to form part of an inventory tracking system. Cycle counter 18 can determine individual product counts for the individual ones of the groupings 12 and can, in some examples, generate and/or monitor overall product counts for each type of physical product 14. For example, a warehouse might contain one hundred groupings 12 of a first type of physical product 14. Cycle counter 18 can determine the individual product count of each grouping 12 of the first type of physical product 14 and can, in some examples, determine the overall product count of the first type of physical product 14 forming all of the relevant groupings 12. For example, cycle counter 18 can sum the individual product counts for each of the one hundred groupings 12 to determine the overall product count.

Cycle counter 18 can, in some examples, be configured to automatically implement an action based on the output product count, which output product count can be either an individual product count or an overall product count. For example, cycle counter 18 can generate and place a refill order based on the output product count reaching or passing a threshold product count. For example, cycle counter 18 can order one or more additional groupings 12 of a physical product 14 based on the overall product count reaching or falling below a threshold count. In some examples, cycle counter 18 can be configured to track a depletion rate for the physical product 14, such as based on the difference in count between multiple product counts and the time delay between when the captured image data is generated for the multiple product counts. Cycle counter 18 can generate the refill order based on the threshold product count and on the depletion rate. For example, cycle counter 18 can be configured to place a larger order based on a quicker depletion rate and can be configured to place a smaller order based on a slower depletion rate. In some examples, cycle counter 18 can be configured to modify orders based on the threshold product count and/or depletion rate. For example, a standing order may be based on an expected depletion rate. Cycle counter 18 can adjust the standing order based on the actual depletion rate as determined by cycle counter 18 varying from the expected depletion rate.

Cycle counter 18 is configured to output a product count of a number of physical products 14 in, for example, a filled or partially filled pallet of products using a single image (e.g., photograph) in concert with product information about the physical products 14 in that pallet. Cycle counter 18 accurately and quickly conducts cycle counting across multiple physical products 14 that can be distributed across multiple physical groupings 12. Cycle counter 18 generates a product count for each grouping 12 based on a single image spaced longitudinally from the grouping 12. Cycle counter 18 reduces downtime associated with cycle counting processes (e.g., some facilities must shut down for multiple hours or days to conduct cycle counting), thereby increasing productivity. Cycle counter 18 provides increased user confidence in the cycle count and provides a more up-to-date cycle count as compared to hand counting, as cycle counter 18 can continuously update the cycle count as additional image data is captured. Cycle counter 18 prevents over- or under-stocking of inventory by quickly and reliably generating timely cycle counts. In some examples, cycle counter 18 can prevent over- or under-stocking by modifying orders based on the determined cycle count.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of cycle counting, the method comprising:
receiving, by a computing device, captured image data of a plurality of physical products forming a physical grouping;
identifying, by the computing device, visible surfaces of the plurality of physical products based on the captured image data and by a recognition computer vision model trained on baseline image data corresponding to physical parameters of the plurality of physical products, to generate identified visible surfaces;
generating, by the computing device, image coordinates for the identified visible surfaces, wherein each image coordinate is a two-dimensional coordinate associated with one of the identified visible surfaces;
generating, by the computing device, a virtual product grouping and base coordinates corresponding to a plurality of virtual products forming the virtual product grouping, wherein each base coordinate is a three-dimensional coordinate associated with a virtual product of the plurality of virtual products;
associating, by the computing device, each identified visible surface with a virtual surface of the plurality of virtual products based on a comparison of the image coordinates and the base coordinates;
classifying, by the computing device, each identified visible surface as horizontal or vertical, thereby generating classified visible surfaces;
determining, by the computing device, a product count of the plurality of physical products in the physical grouping based on an order of the classified visible surfaces; and
outputting, by the computing device, the product count.

2. The method of claim 1, wherein identifying, by the computing device, the visible surfaces of the plurality of physical products includes applying, by the computing device, bounding boxes to the captured image data to identify each of the identified visible surfaces.

3. The method of claim 1, wherein identifying, by the computing device, the visible surfaces of the plurality of physical products includes applying, by the computing device, pixel masks to the captured image data to identify each of the identified visible surfaces.

4. The method of claim 1, further comprising:
identifying, by the computing device, a common location between a two-dimensional space of the captured image data and a three-dimensional space of the virtual product grouping; and
utilizing the common location as a coordinate origin for generating the image coordinates and the base coordinates.

5. The method of claim 4, further comprising:
configuring, by the computing device, the captured image data based on a support surface of the physical product grouping that is visible within the captured image data to generate configured image data, the configured image data having a smaller image area than the captured image data.

6. The method of claim 5, further comprising:
establishing, by the computing device, the coordinate origin based on the support surface.

7. The method of claim 6, wherein establishing, by the computing device, the coordinate origin based on the support surface includes establishing the coordinate origin at a front corner of the support surface.

8. The method of claim 5, wherein, configuring, by the computing device, the captured image data includes configuring the captured image data by a configuration computer vision model trained on baseline image data corresponding to physical parameters of the physical grouping.

9. The method of claim 1, wherein classifying, by the computing device, each identified visible surface includes classifying each identified visible surface as horizontal or vertical by the recognition computer vision model.

10. The method of claim 1, wherein classifying, by the computing device, each identified visible surface includes classifying each identified visible surface as horizontal or vertical based on the comparison between the image coordinates and the base coordinates.

11. The method of claim 1, wherein determining, by the computing device, the product count of the plurality of physical products in the physical grouping based on the order of the identified visible surfaces includes:
determining, by the computing device, a first column count for a first row of the plurality of physical products in the physical grouping based on a first count of a number of horizontal portions present in the first row; and
determining by the computing device, a first layer count for the first row of the plurality of physical products in the physical group based on a second count of a number of vertical portions present in the first row.

12. The method of claim 1, wherein generating, by the computing device, the image coordinates for the identified visible surfaces includes:
locating, by the computing device, the image coordinates at centroids of the identified visible surfaces.

13. The method of claim 12, wherein generating, by the computing device, the virtual product grouping and the base coordinates corresponding to the plurality of virtual products forming the virtual product grouping further includes:
determining, by the computing device, an expected location of each physical product of the plurality of physical products forming the physical grouping relative to each other physical product of the plurality of physical products forming the physical grouping; and
locating, by the computing device, the base coordinates within the three-dimensional space of the virtual product grouping based on the expected location of each physical product of the plurality of physical products.

14. The method of claim 13, wherein generating, by the computing device, the virtual product grouping and assigning the base coordinates to the virtual product grouping further includes:
generating, by the computing device, the virtual product grouping based on the expected location of each of the plurality of physical products within the physical grouping and based on product information regarding the plurality of physical products;
assigning, by the computing device, the base coordinates to virtual surfaces of the plurality of virtual products.

15. The method of claim 14, further comprising:
locating, by the computing device, the base coordinates at centroids of the virtual surfaces.

16. The method of claim 1, further comprising:
receiving, by the computing device, product information regarding at least one physical product of the plurality of physical products forming the physical grouping, the product information including dimensions of the at least one physical product.

17. The method of claim 16, wherein generating, by the computing device, the virtual product grouping and base coordinates corresponding to the plurality of virtual products forming the virtual product grouping includes:
generating, by the computing device, the virtual product grouping based on the product information.

18. The method of claim 1, further comprising:
classifying, by the computing device, each identified visible surface as horizontal or vertical, thereby generating classified visible surfaces before associating, by the computing device, each identified visible surface with the virtual surface of the plurality of virtual products based on the comparison of the image coordinates and the base coordinates such that the comparison of the image coordinates and the base coordinates is conducted based on classified visible surfaces.

19. The method of claim 1, wherein outputting, by the computing device, the product count includes outputting the product count to an inventory tracking system.

20. A cycle counter configured to generate product counts for a physical grouping formed by a plurality of physical product, the cycle counter comprising:
control circuitry; and
memory encoded with instructions that, when executed by the control circuitry, cause the control circuitry to:
identify visible surfaces of the plurality of physical products based on captured image data received by an image-captured device and by a recognition computer vision model trained on baseline image data corresponding to physical parameters of the plurality of physical products, to generate identified visible surfaces;
generate image coordinates for the identified visible surfaces, wherein each image coordinate is a two-dimensional coordinate associated with one of the identified visible surfaces;
generate a virtual product grouping and base coordinates corresponding to a plurality of virtual products forming the virtual product grouping, wherein each base coordinate is a three-dimensional coordinate associated with a virtual product of the plurality of virtual products;

associate each identified visible surface with a virtual surface of the plurality of virtual products based on a comparison of the image coordinates and the base coordinates;
classify each identified visible surface as horizontal or vertical, thereby generating classified visible surfaces;
determine a product count of the plurality of physical products in the physical grouping based on an order of the classified visible surfaces; and
output the product count.

\* \* \* \* \*